(12) United States Patent
Mizukoshi

(10) Patent No.: US 11,522,815 B2
(45) Date of Patent: Dec. 6, 2022

(54) SWITCH, CONTROL APPARATUS, COMMUNICATION SYSTEM, COMMUNICATION CONTROL METHOD AND PROGRAM

(71) Applicant: NEC Corporation, Tokyo (JP)

(72) Inventor: Yasuhiro Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/263,303

(22) PCT Filed: Jul. 31, 2019

(86) PCT No.: PCT/JP2019/029967
§ 371 (c)(1),
(2) Date: Jan. 26, 2021

(87) PCT Pub. No.: WO2020/027181
PCT Pub. Date: Feb. 6, 2020

(65) Prior Publication Data
US 2021/0168094 A1 Jun. 3, 2021

(30) Foreign Application Priority Data
Aug. 1, 2018 (JP) .............................. JP2018-145036

(51) Int. Cl.
*H04L 49/55* (2022.01)
*H04L 12/437* (2006.01)

(52) U.S. Cl.
CPC .......... *H04L 49/557* (2013.01); *H04L 12/437* (2013.01); *H04L 49/555* (2013.01)

(58) Field of Classification Search
CPC ... H04L 49/557; H04L 12/437; H04L 49/555; H04L 2012/40273; H04L 12/44
See application file for complete search history.

(56) References Cited

U.S. PATENT DOCUMENTS

2007/0002883 A1* 1/2007 Edsall ................. H04L 67/1001
370/422
2012/0020361 A1* 1/2012 Ueno ....................... H04L 49/50
370/400

(Continued)

FOREIGN PATENT DOCUMENTS

JP   2007-022176 A   2/2007
JP   2016-529151 A   9/2016

(Continued)

OTHER PUBLICATIONS

International Search Report for PCT Application No. PCT/JP2019/029967, dated Sep. 10, 2019.

(Continued)

*Primary Examiner* — Christine Ng
(74) *Attorney, Agent, or Firm* — Sughrue Mion, PLLC

(57) ABSTRACT

A switch comprises: a register; a control entry holding part that holds control entries set by a predetermined control apparatus; a packet processing part that selects a control entry to be applied to a received packet by referring to a value on the register in addition to match conditions for the control entry; a register change part that changes the value on the register in a case where a change instruction for the value on the register is set to the control entry selected.

13 Claims, 19 Drawing Sheets

(56) References Cited

U.S. PATENT DOCUMENTS

| | | | |
|---|---|---|---|
| 2012/0195233 A1* | 8/2012 | Wang | H04L 12/437 370/258 |
| 2015/0010000 A1* | 1/2015 | Zhang | H04L 45/742 370/392 |
| 2015/0016279 A1* | 1/2015 | Zhang | H04L 47/2441 370/392 |
| 2015/0124815 A1* | 5/2015 | Beliveau | H04L 49/25 370/392 |
| 2016/0129789 A1 | 5/2016 | Halford et al. | |
| 2016/0231977 A1* | 8/2016 | Yamada | G06F 3/0489 |
| 2016/0337250 A1* | 11/2016 | Ni | H04L 69/22 |
| 2018/0065637 A1* | 3/2018 | Bassindale | B60R 25/2063 |
| 2018/0205703 A1* | 7/2018 | Grau | G06F 21/554 |
| 2018/0262466 A1* | 9/2018 | Atad | H04W 76/15 |

FOREIGN PATENT DOCUMENTS

| | | |
|---|---|---|
| WO | 2008/143079 A1 | 11/2008 |
| WO | 2011/083682 A1 | 7/2011 |
| WO | 2014/119602 A1 | 8/2014 |
| WO | 2017/167359 A1 | 10/2017 |

OTHER PUBLICATIONS

Open Flow Switch Specification Version 1.5.1 (Protocol version 0x06), ONF-TS-025, Mar. 26, 2015, pp. 1-283, [online], searched on Jul. 18, 2018, internet <URL: https://3vf60mmveq1g8vzn48q2o71a-wpengine.netdna-ssl.com/wp-content/uploads/2014/10/openflow-switch-v1.5.1.pdf>.

\* cited by examiner

FIG. 5

| REGISTER | VALUE |
|---|---|
| A | 1 ← SHIFT_P |
| B | 1 ← ON/IG |
| C | 1 ← ACC |
| D | 0 ← GPIO1 |
| ... | ... |

FIG. 6

| MATCH CONDITION | ACTION |
|---|---|
| MACSRC=ECU30B, DATA=MODE1 | Register A=0, OUTPUT P2 |
| MACSRC=ECU30B, DATA=MODE2 | Register A=1, OUTPUT P2 |
| MACSRC=ECU30A, Register A=0 | DROP |
| MACSRC=ECU30A, Register A=1 | OUTPUT P1 |
| ⋮ | ⋮ |

FIG. 11

MODE 1

| MATCH CONDITION | ACTION |
|---|---|
| MACSRC=ECU30B, DATA=MODE1 | OUTPUT P2 |
| MACSRC=ECU30A | DROP |
| : | : |

MODE 2

| MATCH CONDITION | ACTION |
|---|---|
| MACSRC=ECU30B, DATA=MODE2 | OUTPUT P2 |
| MACSRC=ECU30A | OUTPUT P1 |
| : | : |

SWITCH, CONTROL APPARATUS, COMMUNICATION SYSTEM, COMMUNICATION CONTROL METHOD AND PROGRAM

CROSS-REFERENCE TO RELATED APPLICATION

This application is a National Stage Entry of PCT/JP2019/029967 filed on Jul. 31, 2019, which claims priority from Japanese Patent Application 2018-145036 filed on Aug. 1, 2018, the contents of all of which are incorporated herein by reference, in their entirety.

FIELD

The present invention relates to a switch, a control apparatus, a communication system, a communication control method and a program.

BACKGROUND

Patent Literature (PTL) 1 discloses an image switch module for a motorcar, with which required image may be displayed on a monitor depending on vehicle drive state without any switch operations by a driver. According to the same literature, the image switch module simultaneously selects image signals from a plurality of receiving parts according to their priority and then outputs them to the monitor.

PTL 2 discloses a vehicle surrounding visualizing apparatus, with which images of a plurality of cameras mounted on a vehicle are automatically selected depending on a drive state so as to improve its visibility. According to the same literature, the vehicle surrounding visualizing apparatus selects a plurality of capture images among each of imaging parts based on the drive state determined by a drive state determination part connected to a variety of sensors. In addition, the vehicle surrounding visualizing apparatus is so disclosed that the selected capture image is subjected to a predetermined image processing depending on the drive state and then displayed on a display part.

PTL 3 discloses a configuration where a variety of on-board modules are connected via a data communication bus (CAN) depending on their utility. Herein, CAN used in the PTL 3 is an abbreviation of "Controller Area Network" and ECU is an abbreviation of "Electronic Control Unit".

In addition, a technology referred to as SDN (Software Defined Network) is recently known, where virtualization of a network is realized using a software. Non-Patent Literature (NPL) 1 is a specification for an open flow switch used upon constructing SDN.

PTL 1: International application publication WO2008/143079A

PTL 2: Tokkai JP2007-22176A

PTL 3: Tokuhyo JP2016-529151A

NPL 1: Open Flow Switch Specification Version 1.5.1 (Protocol version 0x06), ONF, [online], searched on Jul. 18, 2018, internet<URL: https://3vf60mmveq1g8vzn48q2o71a-wpengine.netdna-ssl.com/wp-content/uploads/2014/10/openflow-switch-v1.5.1.pdf>

SUMMARY

The following analyses have been made by the present invention. The configurations of PTLs 1, 2 require a wire harness for simultaneously storing a large number of camera images and a high performance ECU capable of processing these images. Therefore, there is a problem that cost and power consumption are increased. In the future, the number of cameras and their resolution would be increased along with development in an automatic drive technology, thus it is desired to reduce the length of the wire harness and the power consumption.

It is prospected that SDN described in NPL 1 would be applied to the on-board network exemplified in PTLs 1-3 so that a plurality of ECU may share a line having a large transmission capacity, resulting in reduction of the cost and the power consumption. However, in a case where the switch for output of image depending on the vehicle state is executed as disclosed in PTLs 1, 2, an SDN controller for controlling a SDN switch is required to comprehend the vehicle states so as to pertinently control the switch. In order to realize such scheme, it is required to cite a configuration where a variety of sensors are connected to the SDN controller and information from ECU is uploaded, thus it is prospected to result in lack of quick response and impossibility of quick image switching.

Furthermore, the problem in quick response by the SDN controller (hereinafter, also referred to as "controller", "control apparatus" simply) can be said as a common problem in central control networks represented by SDN, but not limited to the on-board network.

It is a purpose of the present invention to provide a switch, a control apparatus, a communication system, a communication control method and a program capable of contributing to improve quick response to an external environment of a network to which SDN is applied.

According to a first aspect, there is provided a switch comprising: a register and a control entry holding part that holds control entries set by a predetermined control apparatus. The switch further comprises a packet processing part that selects a control entry to be applied to a received packet by referring to a value on the register in addition to match condition for the control entry. The switch further comprises a register change part that changes the value on the register in a case where a change instruction for the value on the register is set to the control entry selected.

According to a second aspect, there is provided a control apparatus, comprising: a switch control part that sets, to a switch, a first control entry in which change instructions for a value on a register held by the switch are set and a second control entry which causes the switch to execute a predetermined process using the value on the register as a match condition.

According to a third aspect, there is provided a communication system comprising the above described switch and the above described control apparatus.

According to a fourth aspect, there is provided a communication control method, including a step in which the above described switch refers to the value on a register in addition to the match condition of the control entry so as to select a control entry to be applied to a received packet; and a step in which the value on the register is changed in a case where a change instruction for the value on the register is set to the control entry selected. The method is involved in a specific machine as a switch that refers to the value on the register in addition to the match condition of the control entry so as to select the control entry to be applied to the received packet.

According to a fifth aspect, there is provided a computer program for realizing functions of the above described switch and the above described control apparatus. Herein, the program may be stored in a computer readable (nontransitory) storage medium. That is, the present invention may be realized as a computer program product.

According to the present invention, quick response in a network to which SDN is applied may be improved. That is, the present invention provides a converted switch, wherein the switch is transformed into ones dramatically improved over the central control network switch represented by SDN as described in the background.

BRIEF DESCRIPTION OF THE DRAWINGS

FIG. 5 is a diagram showing correspondence between values on registers of the switch and vehicle state information of the first example embodiment of the present invention.

FIG. 6 is a diagram showing an example of control entries held by the switch of the first example embodiment of the present invention.

FIG. 11 is a diagram showing an example of control entries for explanation of actions by the configuration represented as the comparative example.

PREFERRED MODES

Figure 1:
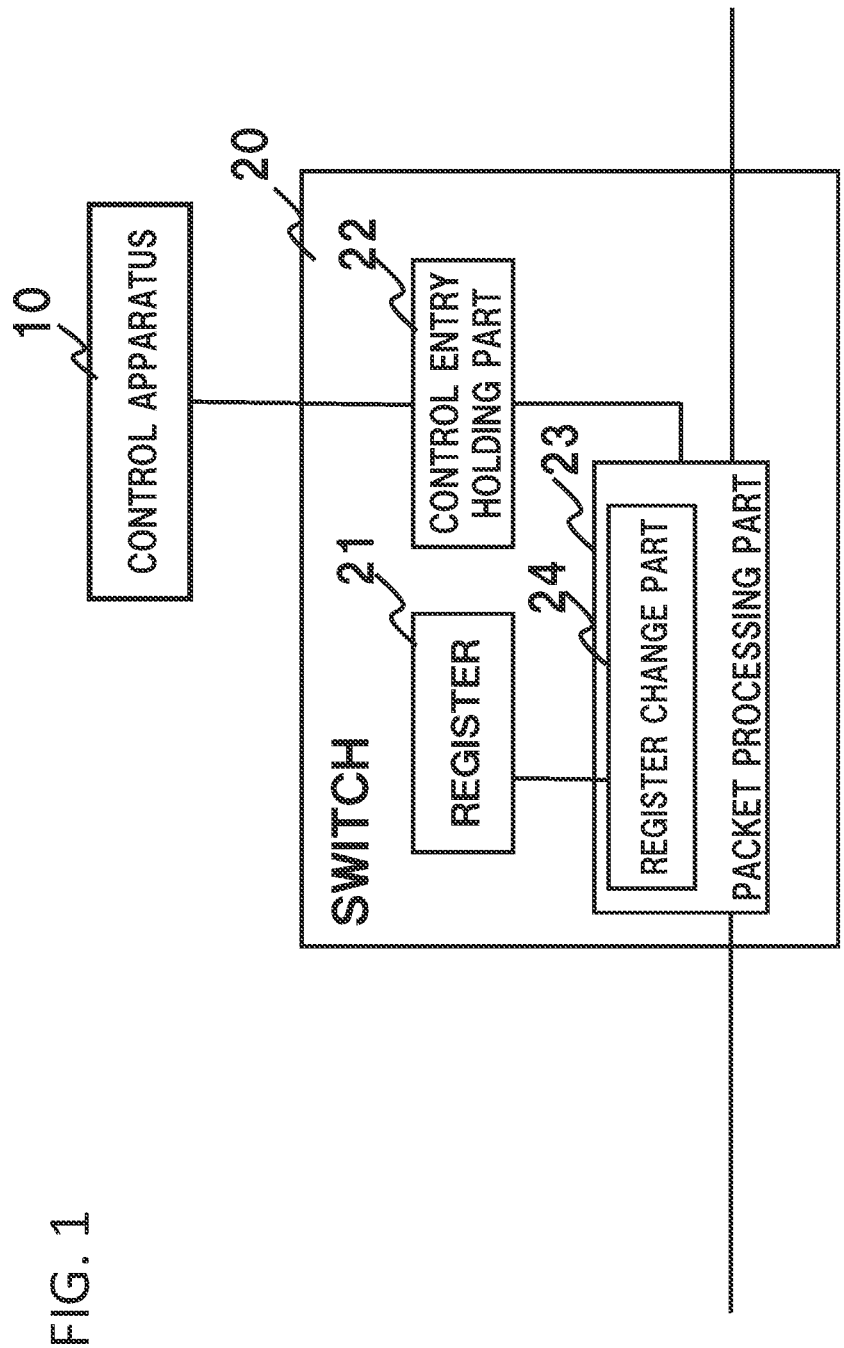
FIG. 1 is a diagram showing a configuration of one example embodiment of the present invention.

First, an outline of one example embodiment of the present invention is explained while referring to drawings. Herein, reference signs described in the outline is expediently appended to each element as one example for an explanatory aid for understanding, but not for intention for limiting the present invention to a configuration illustrated in the drawings. In addition, a connection line between blocks in the drawings and the like referred to in the following explanation comprises both of bidirectional and monodirectional. One-way arrow schematically indicates a main signal (data) flow, but not excluding bidirectional flows. Further, although input/output connection points of each block in the drawings comprise ports and interfaces, they are omitted in the drawings. A program is executed by a computer apparatus, and the computer apparatus comprises, for example, a processor, a storage apparatus, an input apparatus, a communication interface and, if required, a display apparatus. In addition, the computer apparatus is configured to communicate with an internal or external apparatus (including a computer) via a communication interface, regardless of wired communication or radio communication. Further, in the explanation below, a phrase "A and/or B" is used for denoting a meaning that at least one of A and B.

One example embodiment of the present invention is realized (implemented) by a switch comprising a register 21, a control entry holding part 22, a packet processing part 23, and a register change part 24, as illustrated in FIG. 1.

More concretely, the control entry holding part 22 holds control entries set by a predetermined control apparatus 10. The control entry holding part 22 corresponds to a flow table in an open flow switch described in NPL 1. Differences from a flow entry in NPL 1 are a point that a value of register may be set to a match condition, and a point that change instruction for the value on the register may be set as an action as illustrated in a balloon in FIG. 2.

Figure 2:
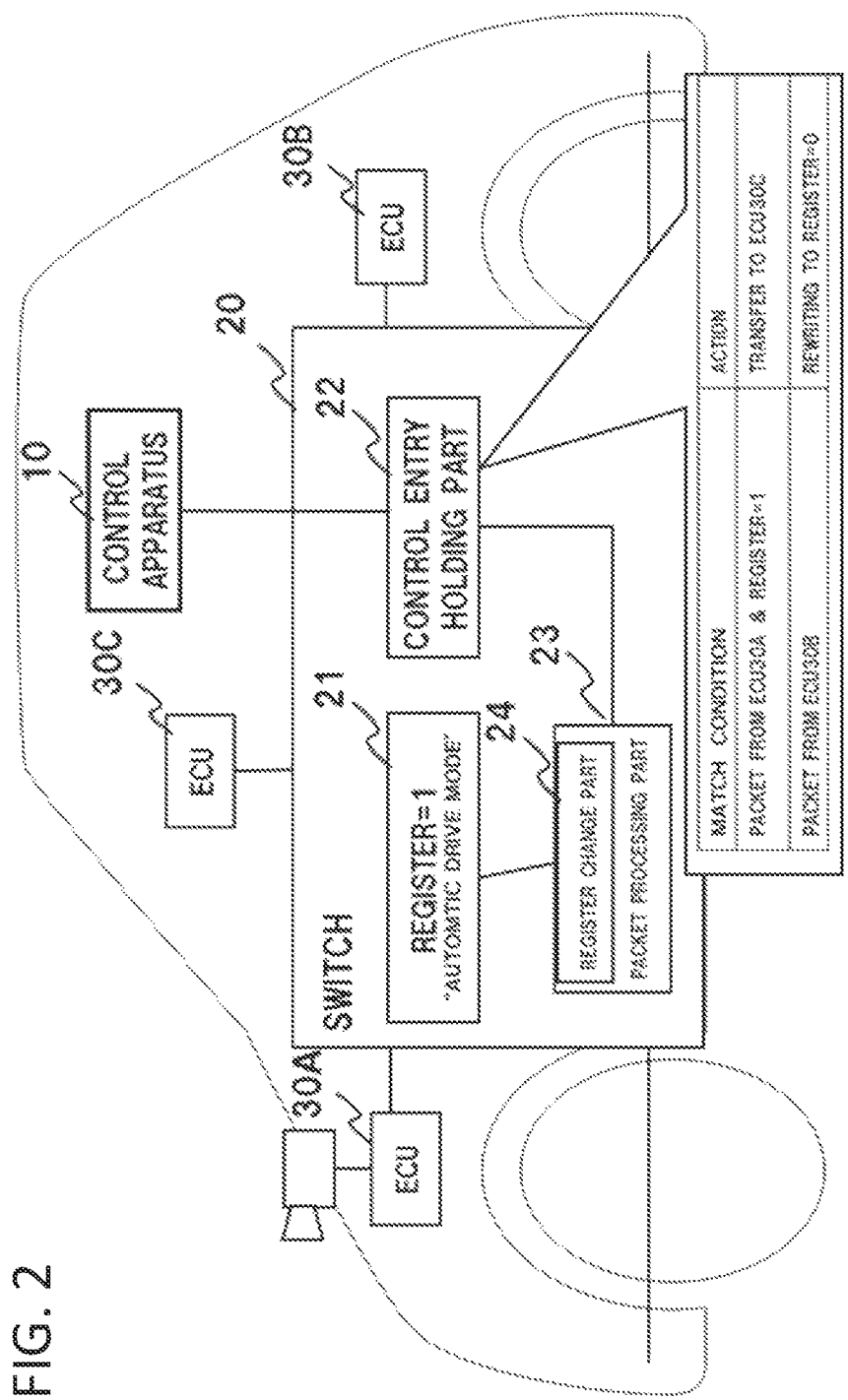
FIG. 2 is an explanatory view of actions in one example embodiment of the present invention.

The packet processing part 23 selects a control entry to be applied to a received packet by referring to the value on the register in addition to match conditions for the control entry. For example, as illustrated in FIG. 2, in a case of a packet from ECU 30A and a case where the value on the register is 1 (automatic drive mode), the packet processing part 23 executes an action for transmitting the packet from ECU 30A to ECU 30C which operates automatic drive control. Thereby, under the automatic drive mode, camera images may be transmitted to ECU 30C. On the other hand, in a case where the value on the register is a value other than 1 (other than the automatic drive mode), the packet processing part 23 does not execute the action of transferring the packet from ECU 30A to ECU 30C even when it receives a packet from ECU 30A. Thereby, a line between the switch 20 and ECU 30A and a line between the switch 20 and ECU 30C may be released for the other communication.

The register change part 24 changes the value on the register in a case where a change instruction for the value on the register is set to the control entry matching with the received packet. For example, as illustrated in FIG. 2, in a case where the register change part 24 receives a packet form ECU 30B, the register change part 24 executes an action for rewriting the register to 0. Thereby, in the following sequence, even if a packet from ECU 30A is received, it is not transferred to ECU 30C. For example, in a case where ECU 30B is an ECU that relays data from a camera or a sensor arranged at rear side, reception of a packet from ECU 30B indicates that a vehicle is released from an automatic drive mode and a driver made a backward traveling operation. As described above, according to the present invention, switch behavior may be switched without waiting explicit (or determinative) update of the control entries. Of course, the above example of ECU 30B is merely one example, thus, alternatively, it is possible to set control entries for updating the register with a trigger due to reception of a packet indicating termination of the automatic drive.

First Example Embodiment

Figure 3:
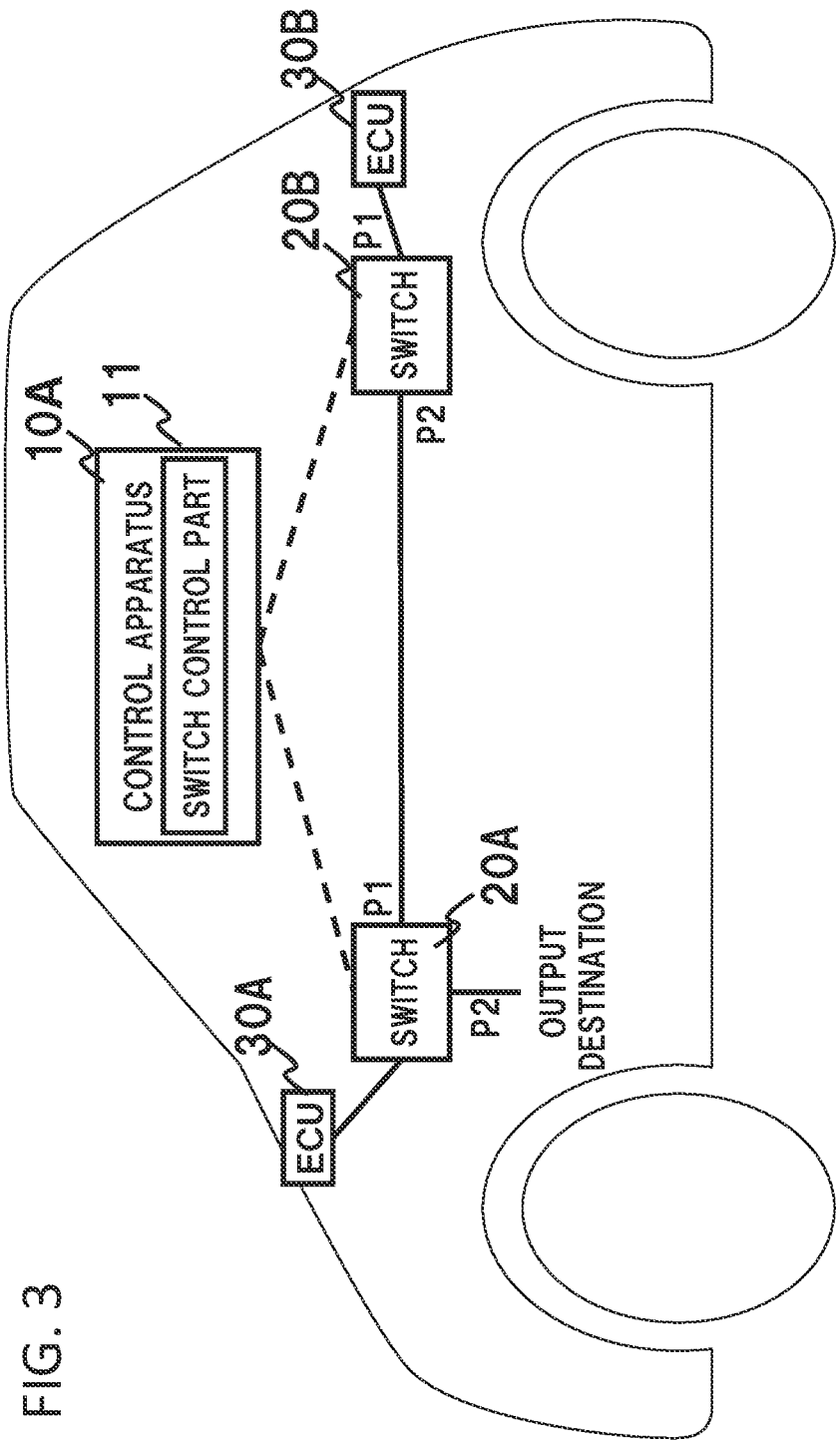
FIG. 3 is a diagram showing a configuration of a communication system (on-board network system) of a first example embodiment of the present invention.

Next, a first example embodiment of the present invention will be explained in detail while referring to the drawings. FIG. 3 is a diagram showing a configuration of a communication system (on-board network system) of the first example embodiment of the present invention. FIG. 3 illustrates a configuration where ECU 30A, 30B, switches 20A, 20B and a control apparatus 10A are connected. Herein, reference signs P1, P2 in FIG. 3 respectively indicate port numbers of the switches 20A, 20B.

The control apparatus 10A is an apparatus corresponding to an SDN controller that sets control entries to the switches 20A, 20B. The control apparatus 10A comprises a switch control part 11 that sets control entries to the switches 20A, 20B. The switch control part 11 further has a function that sets a first control entry in which change instructions for register values held by the switches 20A, 20B are set and a second control entry that causes the switches to execute a predetermined process using the value(s) on the register as a match condition.

ECU 30A is, for example, an ECU which is connected to a front camera and to which images transmitted from the front camera are input. ECU 30B is, for example, an ECU which is connected to a rear camera and to which images transmitted from the rear camera are input. In the present example embodiment, ECU 30A, 30B are explained based on an assumption that they transmit images respectively input from the cameras to the side of the switches 20A, 20B.

The switches 20A, 20B are apparatuses corresponding to an SDN switch that transfers, discards, rewrites a packet, and the like using a control entry matching with a received packet.

The switches 20A, 20B of the present example embodiment have a function that refers to a register indicating a vehicle state so as to select a control entry in addition to a function corresponding to the SDN switch. Furthermore, the switches of the present example embodiment have a function that updates a register in a case where an update instruction for the register has been set to the control entry matching with the received packet.

Figure 4:
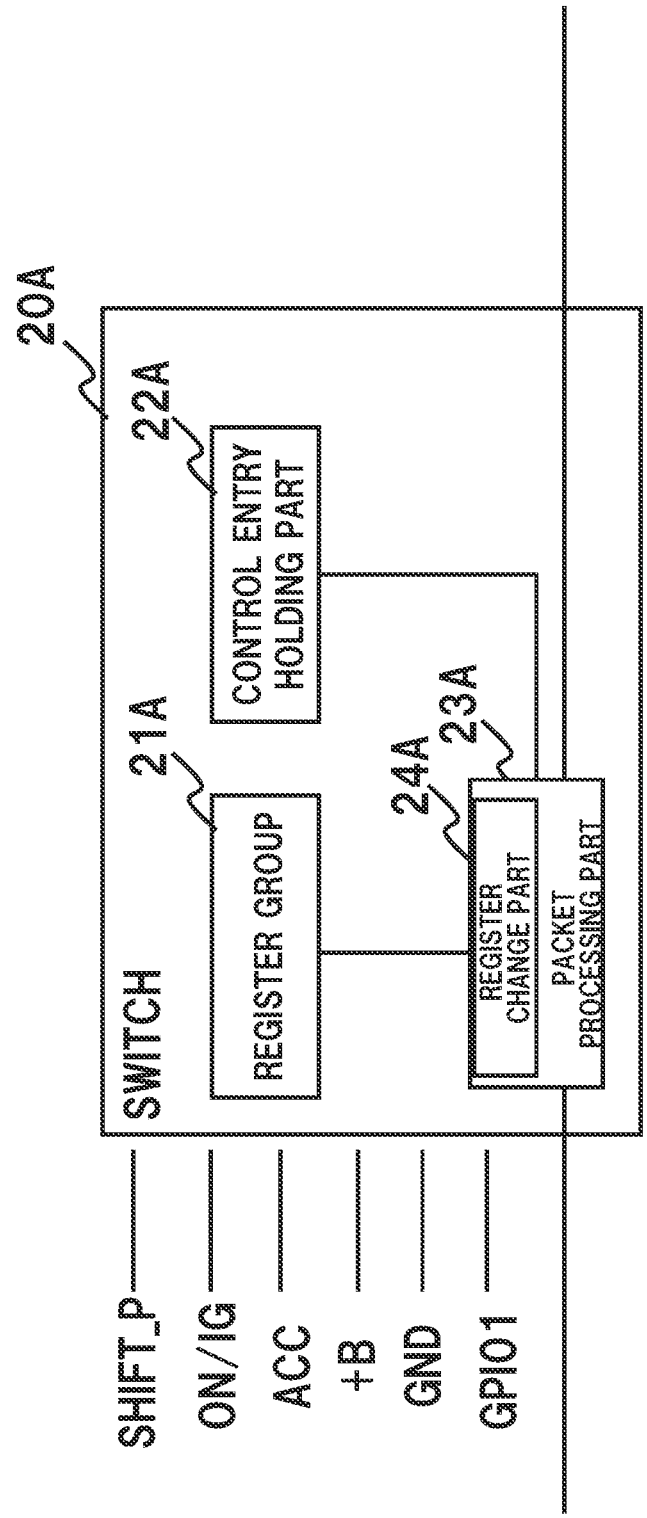
FIG. 4 is a functional block diagram showing a configuration of the switch of the first example embodiment of the present invention.

FIG. 4 is a functional block diagram illustrating a configuration of the switch 20A. Referring to FIG. 4, the switch 20A comprises a register group 21A, a control entry holding part 22A and a packet processing part 23A.

The register group A is, for example, configured by a plurality of registers as illustrated in FIG. 5. Each register may hold a value (state information) indicating an associated (or assigned) vehicle condition. In an example of FIG. 5, register A holds information indicating whether or not a shift position is being an advance shift position. Register B holds information indicating whether or not a key switch is being an ON/IG (IG power on) position. Similarly, register C holds information indicating whether or not a key switch is being an ACC (ACC power on) position (herein, ACC refers to an abbreviation of "accessory"). Similarly, register D holds a value input from a general input/output port 1 (GPIO1). These values are rewritten by the switch based on information input from a corresponding ECU. Herein, the vehicle state information is not limited to the examples in FIG. 5. For example, a register may hold vehicle speed information obtained from a VDC (Vehicle Dynamics Control). As the other examples, a register may store head light state, winker state [state of turn signal lumps], state of switches for a variety of accessories, steering angle of a handle and the like. Furthermore, in a case where the steering angle of the handle is binarized, a larger steering angle and a smaller steering angle may be determined depending on, for example, whether or not several bits from MSB (Most Significant Bit) are "0" in bit information to be stored.

The control entry holding part 22A holds control entries where match conditions and actions are associated. FIG. 6 is a diagram showing an example of control entries held by the switch 20A. Set to the uppermost entry in FIG. 6 is a match condition indicating that a transmission source MAC address (MACSRC) is MAC address of ECU 30B and data is MODE 1. In addition, also set is an action of a case where a packet matching with the match condition is received, according to which register A is rewritten to 0 and then the packet is output. Similarly, defined in a second entry is a content that, in a case where transmission source MAC address (MACSRC) is MAC address of ECU 30B and data is MODE 2, the register A is rewritten to 1 and then a received packet is output. Furthermore, defined in a third entry from upper side in FIG. 6 is a content that, in a case where transmission source MAC address (MACSRC) is MAC address of ECU 30A and register A is 0, a received packet is discarded (DROP). Similarly, defined in a fourth entry from upper side is a content that, in a case where transmission source MAC address (MACSRC) is MAC address of ECU 30A and register A is 1, a received packet is output. In the explanation below, it is assumed that MODE 1 is data which should be allowed to flow under a case where the shift position is in a range other than advance range, MODE 2 is data which should be allowed to flow under a case where the shift position is in the range of the advance range.

When the packet processing part 23A receives a packet from ECU 30A or the switch 20B, the packet processing part 23A searches the control entry holding part 22A for a control entry matching with the received packet and executes a process set to an action field therein.

In addition, the packet processing part 23A of the present example embodiment comprises a register change part 24A. In a case where an action instructing change of register is set to the action field of the control entry matching with the received packet, the packet processing part 23A instructs the register change part 24A to change the register.

The register change part 24A changes the value of the designated register according to the instruction from the packet processing part 23A.

Herein, the configuration of the switch 20B is the same as that of the switch 20A excepting for only a difference on the contents in the control entry held by the control entry holding part 22A, thus explanation thereof is omitted.

Figure 7:
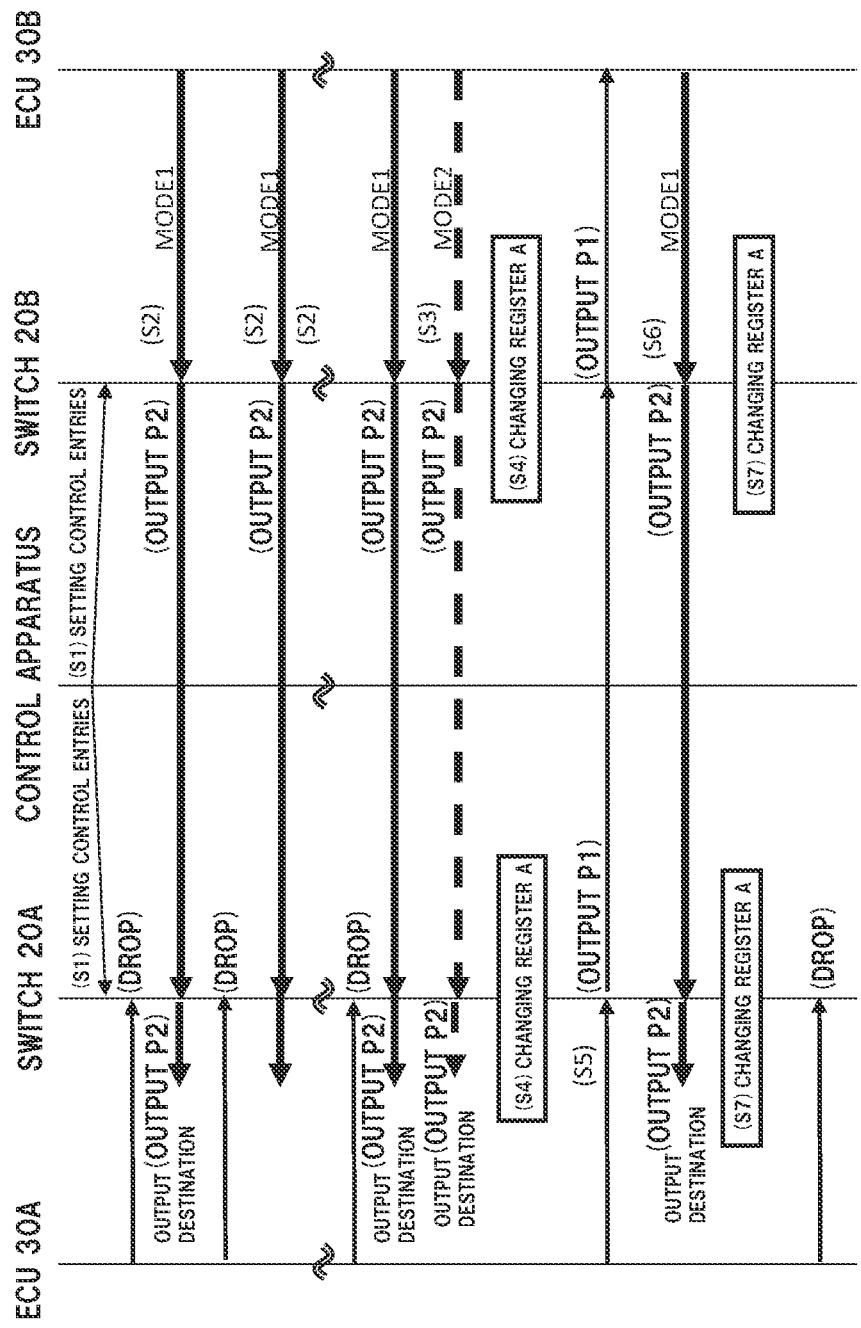
FIG. 7 is a sequence diagram showing actions of the first example embodiment of the present invention.

Next, actions in the present example embodiment will be explained in detail referring to drawings. FIG. 7 is a sequence diagram illustrating actions in the first example embodiment of the present invention. As illustrated in FIG. 7, first, the control apparatus 10A sets control entries to the switches 20A, 20B. Herein, this explanation follows an assumption that the control apparatus 10A sets flow entries illustrated in FIG. 6 (step S1) to the switch 20A. In addition, the following example is explained based on an assumption that 0 (other than advance range) has been set to the register A indicating the shift position.

After that, in the example in FIG. 7, ECU 30A transmits a packet which stores front camera images to the switch 20A. The switch 20A that received the packet discards the packet transmitted from ECU 30A according to the third control entry from upper side in the control entries illustrated in FIG. 6 (see FIG. 7).

Figure 8:
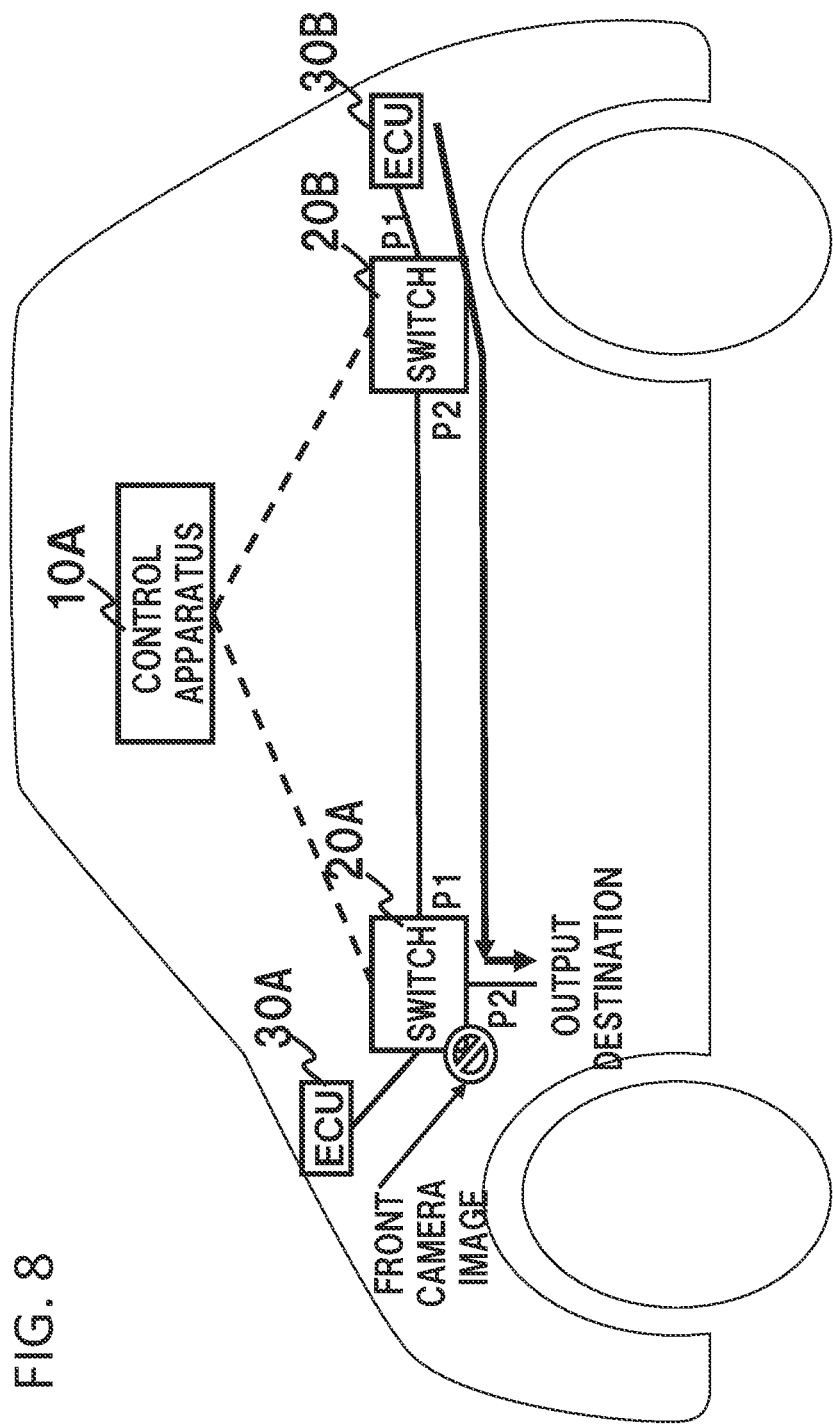
FIG. 8 is an explanatory view of the actions of the first example embodiment of the present invention.

On the other hand, ECU 30B transmits a packet storing rear camera images (MODE 1) to the switches 20B, 20A (step S2). The switch 20A that received the packet outputs the packet which is transmitted from ECU 30B and includes information indicating that the data is MODE1 data to a predetermined output destination (port P2) (see FIG. 8). Herein, since the action for rewriting the register A to 0 is set to the uppermost control entry illustrated in FIG. 6, the switch 20A keeps the value on the register A at 0 while receiving similar packets. Thereby, the value on the register A is kept.

On the other hand, in cases where a driver performs switching of a travel (running) range to the advance range and the like, ECU 30B transmits a packet storing data (MODE 2) other than the rear camera images to the switches 20B, 20A (step S3). The switch 20A received the packet outputs the packet that is transmitted from ECU 30B and includes information indicating that data is MODE2 data to a predetermined output destination (port P2) according to the second control entry from upper side in FIG. 6 (see step S3, FIG. 8). Further, since the action of rewriting the register A to 1 is set to the corresponding control entry, the switches 20A, 20B respectively rewrite the register A to 1 (step S4). Thereby, the switch 20A recognizes that the shift position is changed to the advance range without receiving any instructions from the control apparatus 10A. Herein, it may be determined whether data is MODE2 data or not, for example, if ECU as the transmission source sets a predetermined ID as VLAN ID in a packet header and the like.

Figure 9:
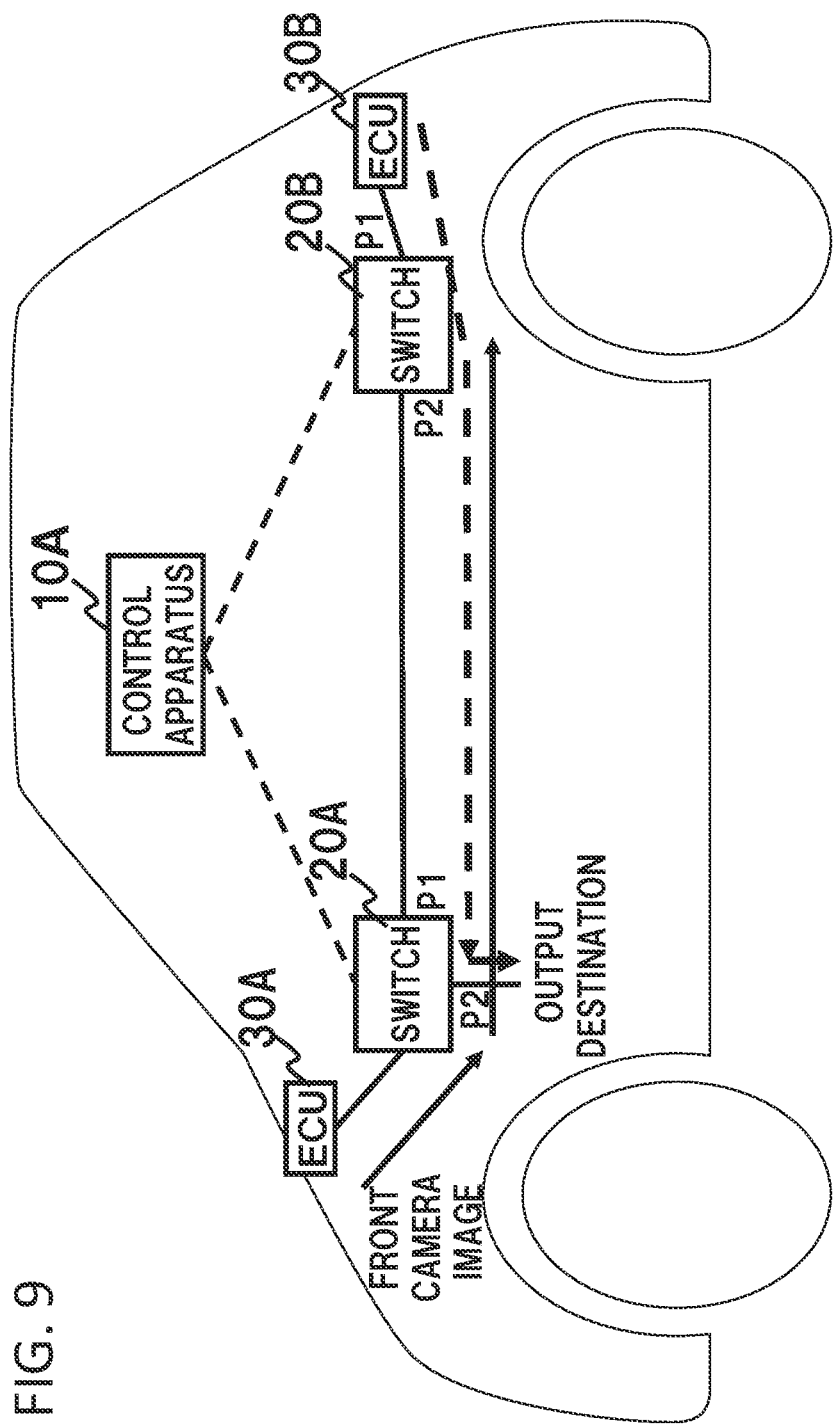
FIG. 9 is an explanatory view of the actions of the first example embodiment of the present invention.

In the following sequence, the switch 20A selects a control entry by using register A=1 as the match condition upon selecting the control entry. For example, assume that ECU 30A transmitted a packet storing front camera images to the switch 20A. In such case, the switch 20A outputs the packet transmitted from ECU 30A to the side of the switch 20B (port P1) according to the fourth control entry from upper side in FIG. 6 (see step S5; FIG. 9).

After that, ECU 30B further transmits a packet storing rear camera images (MODE 1) to the switches 20B, 20A (step S6). The switches 20B, 20A received the packet rewrite the register A to 0 according to the uppermost control entry in FIG. 6 (step S7). Thereby, the switches 20B, 20A recognize that the shift position is changed to a range other than the advance range without receiving any instructions from the control apparatus 10A. Herein, it may be identified whether data is MODE1 data or not, for example, if ECU as a transmission source sets a predetermined ID as VLAN ID in a packet header and the like.

In the following sequence, the switch 20A selects a control entry by using register A=0 as the match condition upon selecting the control entry. For example, when ECU 30A transmits a packet storing front camera images to the switch 20A, the switch 20A restarts discard of packets transmitted from ECU 30A according to the third control entry from upper side in the control entries illustrated in FIG. 6 (see FIG. 8).

As explained above, according to the present example embodiment, the switches 20A, 20B switch processes for the received packets as a response to the shift position change without receiving any instruction from the control apparatus 10A for every operation. When a control entry realizing a similar received packet switch is set, processing of the received packet may be switched depending on position of a key switch, input value of a general input/output port 1 (GPIO1), and their combinations.

In addition, match conditions other than a match condition for determining whether or not the value of the register is a specific value in FIG. 6 may be set as the match conditions for the control entries. Match conditions, for example, Register C>TH1, Register D<TH2, may be set as the match condition, where comparison is executed with thresholds TH1, TH2. Thereby, steering angle, traveling speed, engine rotational speed, remaining battery capacity and the like may be held on the register so that a switch may perform switching by itself under comparison with a threshold.

Figure 10:
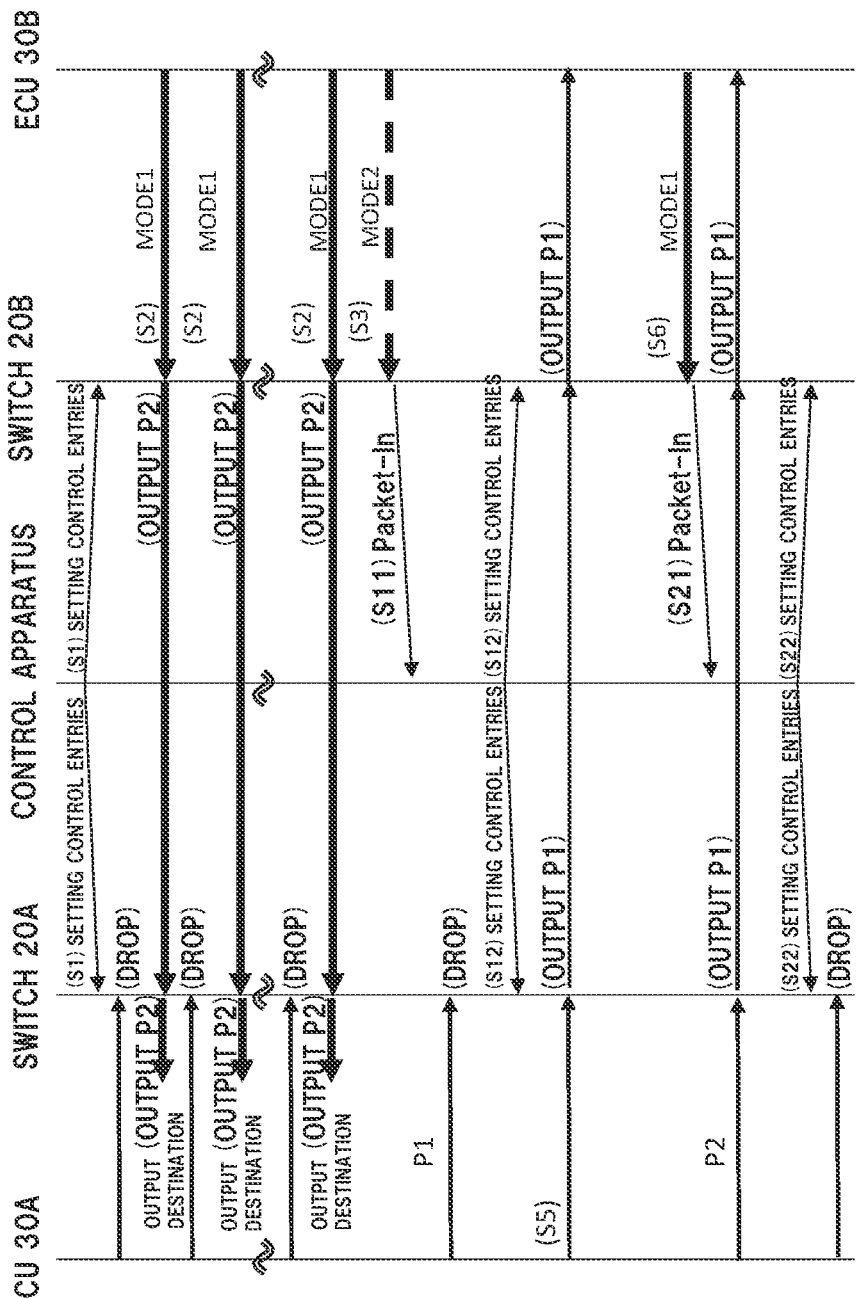
FIG. 10 is a sequence diagram showing actions by a configuration represented as a comparative example.

Herein, as a comparative example, actions of a case where the control apparatus 10 operates the control entries are explained while referring to a sequence diagram illustrated in FIG. 10. In the comparative example, the control apparatus 10 detects change in the shift position by an inquiry from a switch for a control entry and executes switching of the control entries as illustrated in FIG. 11. In step S1 in FIG. 10, it is assumed that a combination of control entries for MODE 1 shown in FIG. 11 is set. Actions in step S2 are similar with those in FIG. 7. However, when MODE 2 packet is input in step S3, since there is no control entry matching with the packet, the switch 20A requests the control apparatus 10 to set the control entries (step S11; Packet-In).

The control apparatus 10 having received the request for setting the control entries sets a combination of control entries for MODE 2 illustrated in FIG. 11 (step S12). However, when compared with FIG. 7, since a period of time for setting the control entries is required, packet P1 transmitted from ECU 30A would be discarded. After that, when the switch 20A further receives MODE 1 packet from ECU 30B, the switch 20A requests the control apparatus 10 to set the control entries, since there is no control entry including a match condition matching with the packet (step S21; Packet-In). In this situation, when compared with FIG. 7, packet P2 transmitted from ECU 30A is allowed to pass through, which should be discarded under MODE 1 (other than the advance range), since a period of time for setting the control entries is required, too.

As apparent from the above comparison with the comparative example, according to the present example embodiment, switching action(s) for the switch is/are executed without waiting operation for the control entries by the control apparatus 10. Therefore, quick response by an on-board network system using SDN is improved.

Second Example Embodiment

Figure 12:
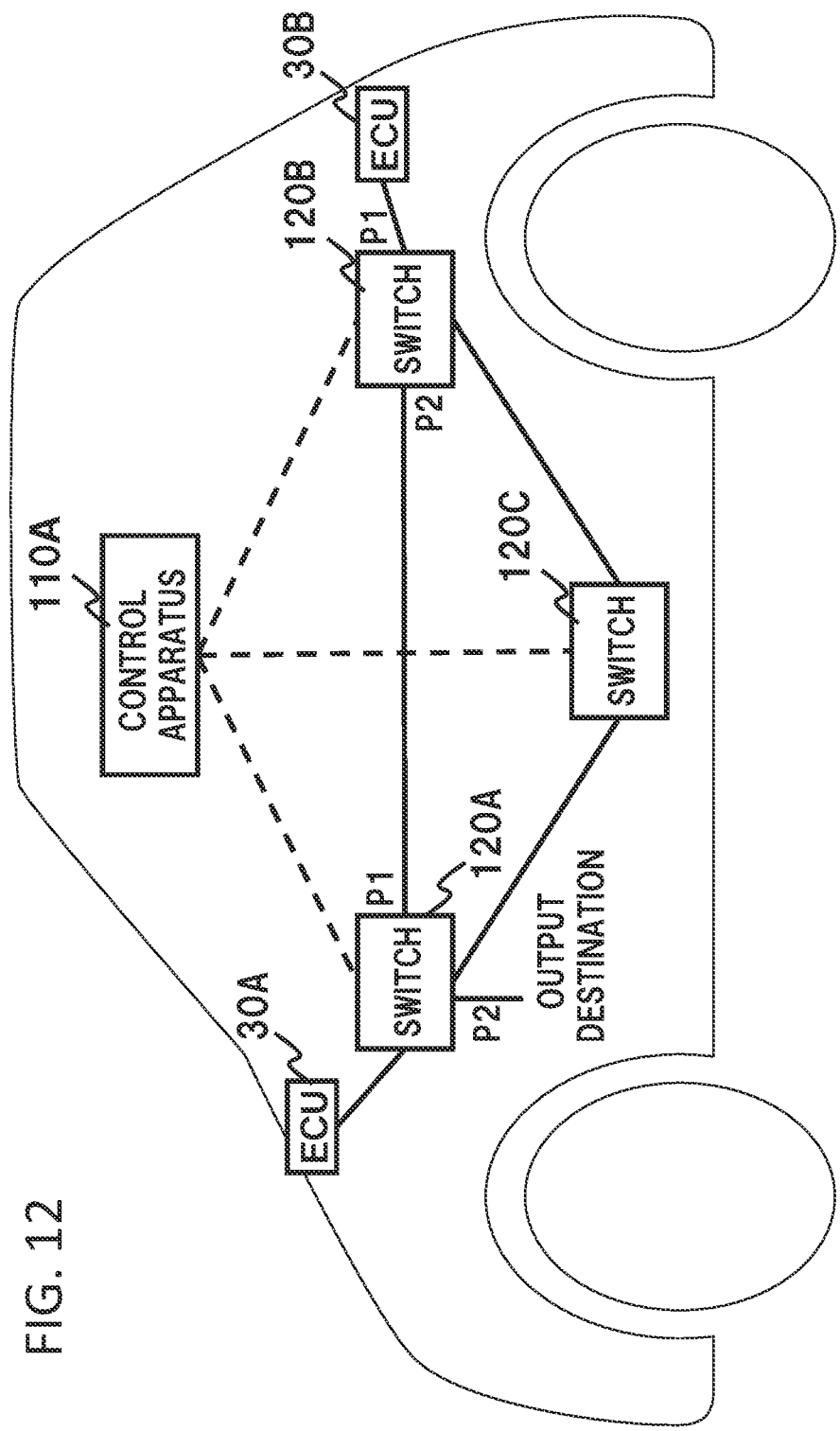
FIG. 12 is a diagram showing a configuration of a communication system (on-board network system) of a second example embodiment of the present invention.

Next, a second example embodiment of the present invention will be explained in detail while referring to drawings. FIG. 12 is a diagram showing a configuration of a communication system (on-board network) of the second example embodiment of the present invention. FIG. 12 illustrates a configuration where ECUs 30A, 30B, switches 120A, 120B, 120C and a control apparatus 110A are connected. Differences from the first example embodiment illustrated in FIG. 3 reside in a point that the switch 120C is added and a point that notification function to the control apparatus 110A upon register change is added to each of the switches 120A, 120B, 120C. In addition, a setting function of control entries based on notification upon the register change is added to the side of the control apparatus 110A. The other configurations are the same as the first example embodiment, thus the explanation below focuses on these differences.

In the first example embodiment, all of the switches 20A, 20B can change register in a case where they receive a packet with which the register should be changed, since packets between ECU 30A and ECU 30B pass through all of the switches 20A, 20B. However, in the configuration illustrated in FIG. 12, there are two packet transmission pathways between ECU 30A and ECU 30B, including a pathway passing through the switches 120A, 120B and a pathway passing through the switches 120A, 120C, 120B. In a case where the packet transmission pathway does not include the switch 120C, there is a situation where the switch 120 cannot change the register.

Therefore, in the present example embodiment, the notification function to the control apparatus 110A upon register change is added to each of the switches 120A, 120B, 120C.

Figure 13:
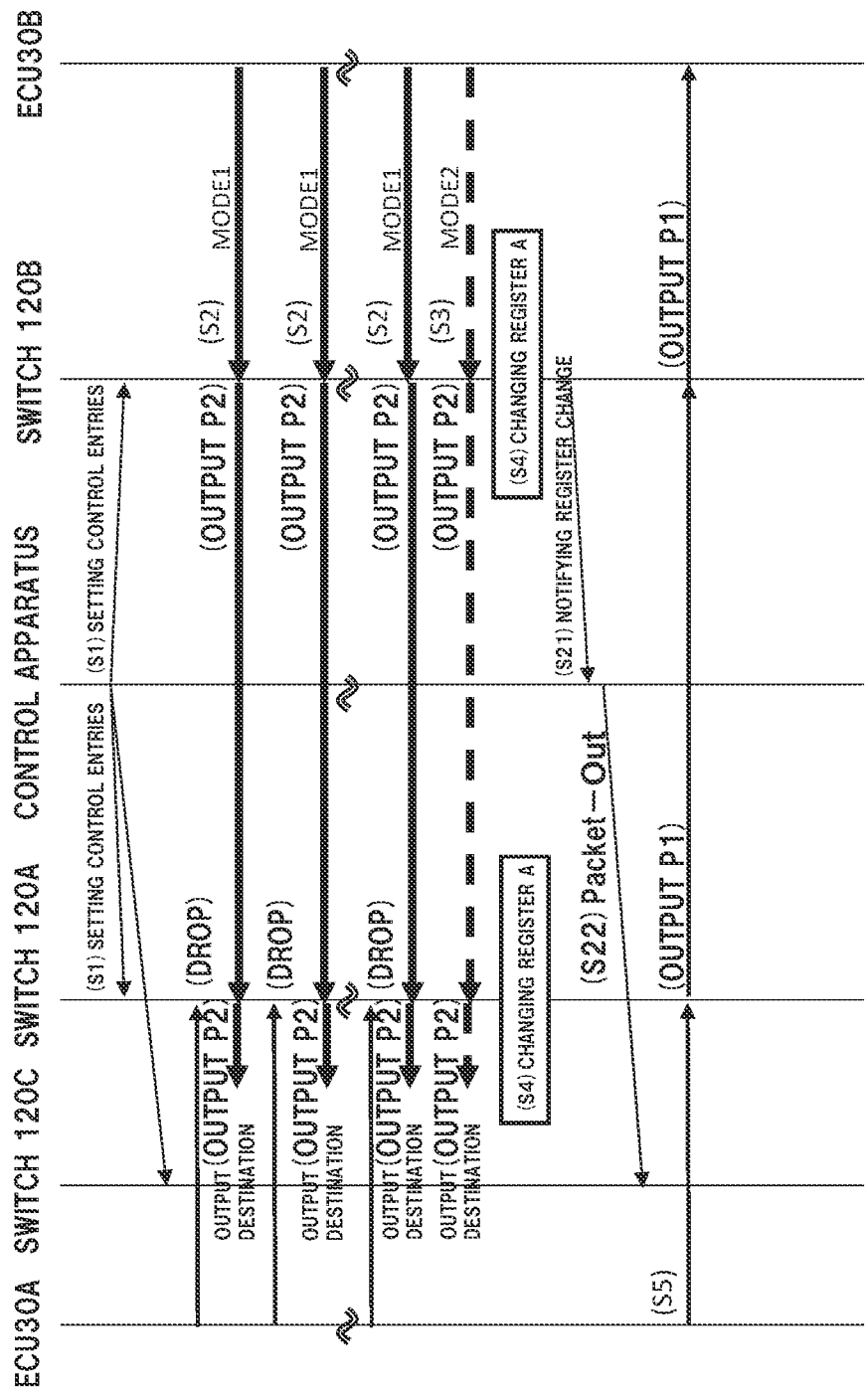
FIG. 13 is a sequence diagram showing actions of the second example embodiment of the present invention.

FIG. 13 is a sequence diagram showing actions in the second example embodiment of the present invention. As illustrated in FIG. 13, first, the control apparatus 110A sets control entries to the switches 120A to 120C. Herein, the following explanation follows an assumption that the control apparatus 110A sets the flow entries illustrated in FIG. 6 to the switch 120A (step S1). In addition, in the example below, the following explanation is given under assumption that the register A indicating the shift position has been set to 0 (other than the advance range).

After that, in the example in FIG. 13, ECU 30A transmits a packet storing front camera images to the switch 120A. The switch 120A having received the packet discards the packet transmitted from ECU 30A according to the third control entry from upper side in the control entries illustrated in FIG. 6.

On the other hand, ECU 30B transmits a packet storing rear camera image (MODE 1) to the switches 120B, 120A (step S2). The switch 120A having received the packet outputs the packet which is transmitted from ECU 30B and includes information indicating that data is MODE1 data to the predetermined output destination (port P2) according the uppermost control entry in FIG. 6. Herein, since an action of rewriting the register A to 0 is set in the uppermost control entry in FIG. 6, the switch 120A keeps the value of the register A at 0 while receiving similar packets. Herein, it can be identified that the data is MODE1 data or MODE2 data, for example, if ECU as the transmission source sets a predetermined ID as VLAN ID in a packet header and the like.

On the other hand, in cases where a driver performs switching from a travel range to the advance range, ECU 30B transmits a packet storing data (MODE 2) other than the rear camera images to the switches 120B, 120A (step S3). The switches 120B, 120A having received the packet respectively rewrite the register A to 1, since the action of rewriting the register A to 1 is set in the corresponding control entry (step S4). Thereby, the switches 120B, 120A recognize that the shift position is changed to the advance range without receiving any instruction from the control apparatus 110A. Above actions are the same as those in the first example embodiment.

In the present example embodiment, the switch 120B which rewrites the register A further notifies the control apparatus 110A that the register is changed (step S21; register change notice). The control apparatus 110A having received the register change notice outputs a packet to the switch 120C which is out of the transmission pathway for the packet triggering the register change for causing the switch 120C to change the value on the register A (step S22; Packet-Out). Thereby, also the switch 120C can change the register A to 1. Herein, the control apparatus 110A may directly rewrite the register on the switch 120C instead of the transmission of the packet for causing the switch 120C to change the value on the register A. In addition, a method may be adopted, in which a control entry depending on vehicle state is set. Further, instead of the method in which the control apparatus 110A is interposed, a method may be also adopted where the switch 120B transmits a packet to the switch 120C for triggering the register change by the switch 120C simultaneously with rewriting of the register by the switch 120B.

After that, the switches 120A to 120C select the control entry using register A=1 as the match condition upon selecting the control entry. For example, assume a case where ECU 30A transmits a packet storing front camera images to the switch 120A. In such case, the switch 120A outputs the packet transmitted from ECU 30A to the side of the switch 20B according to the fourth control entry from upper side in the control entries illustrated in FIG. 6 (step S5).

As explained above, since the control apparatus is involved indirectly, a switch which cannot receive a packet for triggering the register change can be instructed to change the corresponding register.

Third Example Embodiment

Figure 14:
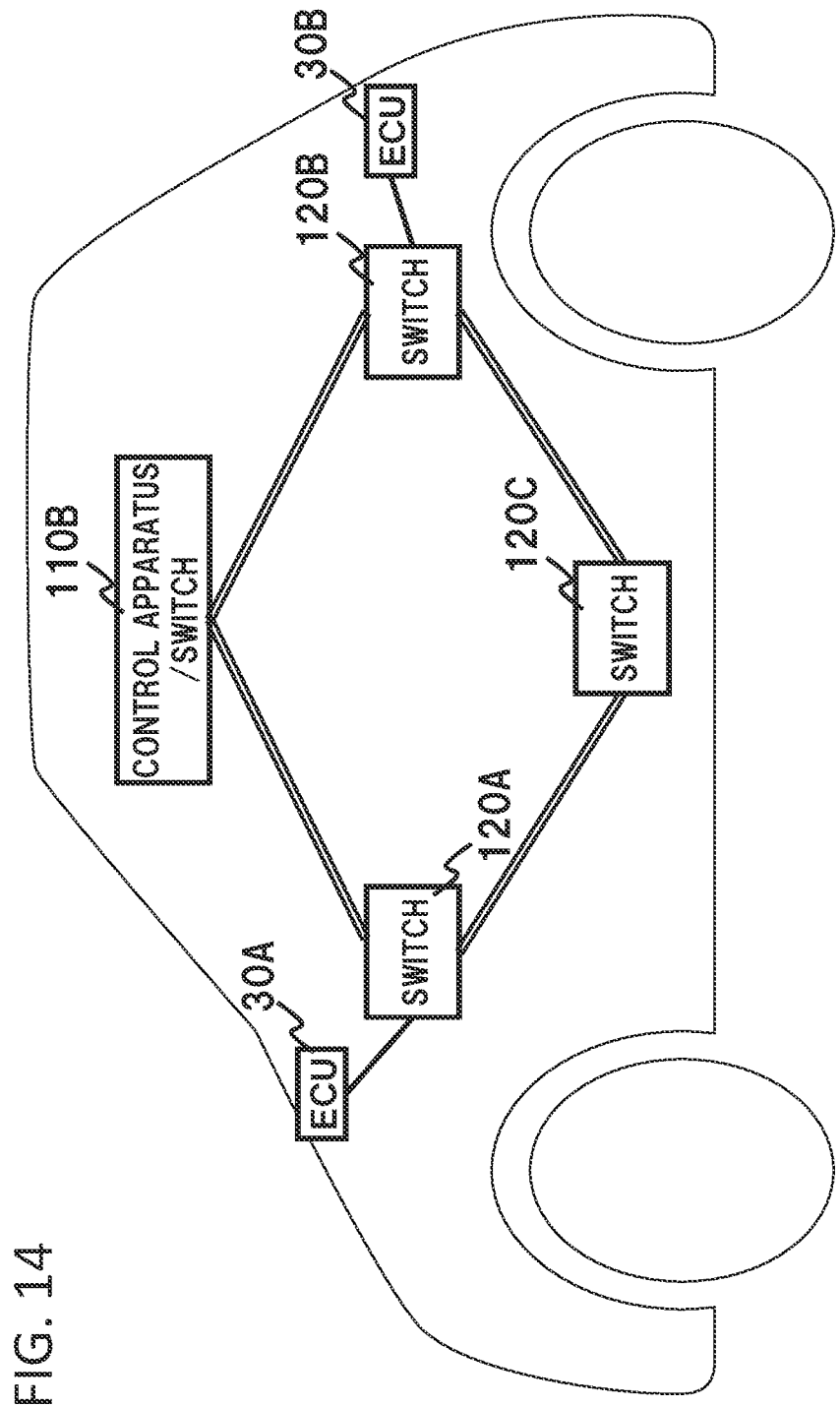
FIG. 14 is a diagram showing a configuration of a communication system (on-board network system) of a third example embodiment of the present invention.
Figure 15:
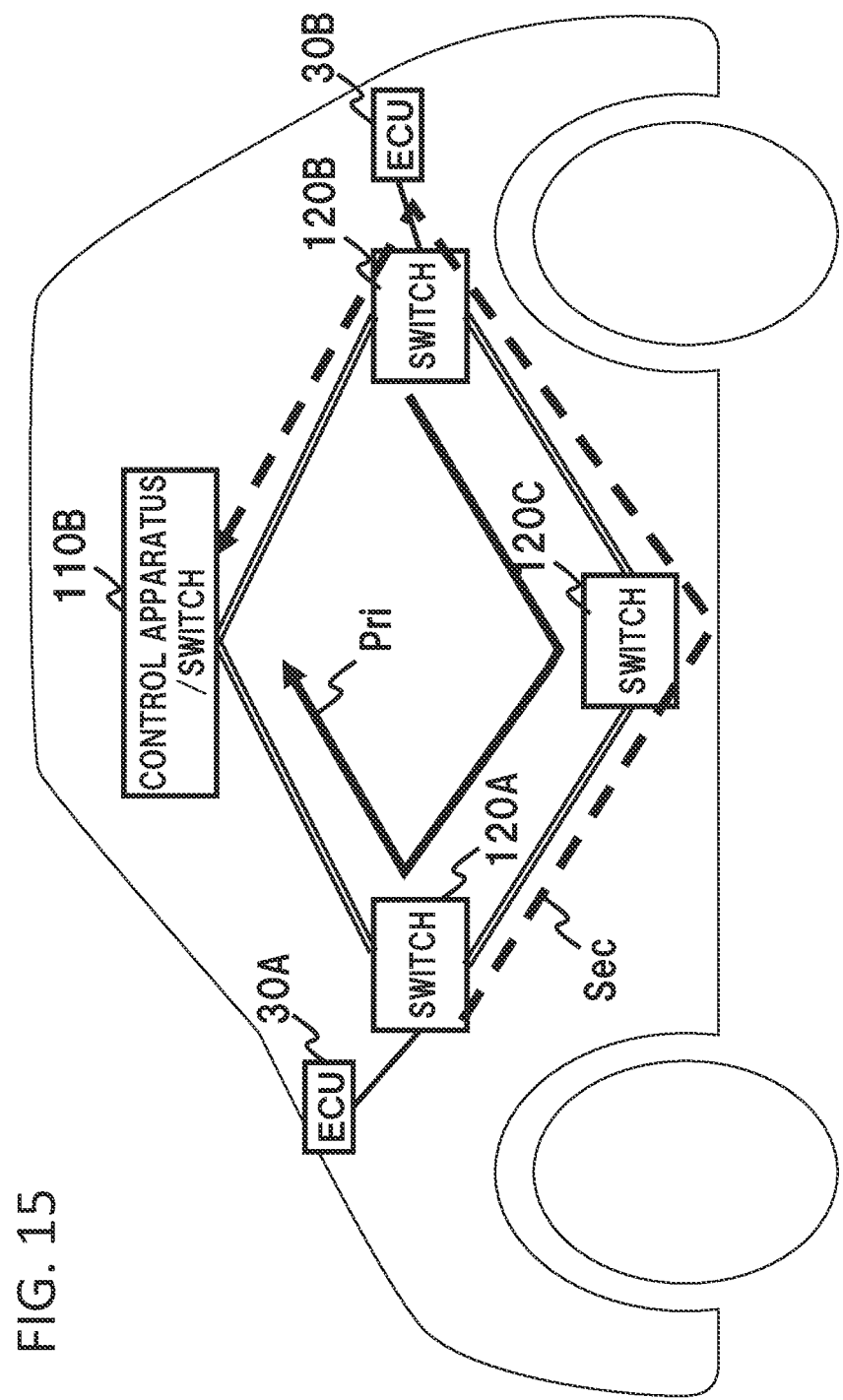
FIG. 15 is a diagram showing control channels set in the communication systems (on-board network system) of the third example embodiment of the present invention.

Next, a third example embodiment of the present invention in which a modification is added to the configuration of the control channels between the switches and the control apparatus of the first, second example embodiments will be explained in detail while referring to drawings. FIG. 14 is a diagram showing a configuration of a communication system (on-board network) of the third example embodiment of the present invention. Differences from the configurations illustrated in FIG. 3 and FIG. 12 reside in a point that a switch (also referred to as "switch 110B") is installed in the control apparatus 110B and a point that the switch 110B, switches 120A to 120C are connected in a ring shape. That is, the switches 120A to 120C of the present example embodiment configure a control channel having a ring shape topology so as to be connected to the control apparatus 110B.

In the present example embodiment, a clockwise (primary (Pri)) control channel (C-Plane) and a counterclockwise (secondary (Sec)) control channel are configured between each of the switches. Thereby, it is succeeded to enhance availability, but not only to function as the control channels between the switches and the control apparatus in the first, second example embodiments. Actions, such as rewriting the register, etc., are the same as those of the first, second example embodiments, thus the explanation below focuses on actions upon the occurrence of a failure in the control channel.

Figure 16:
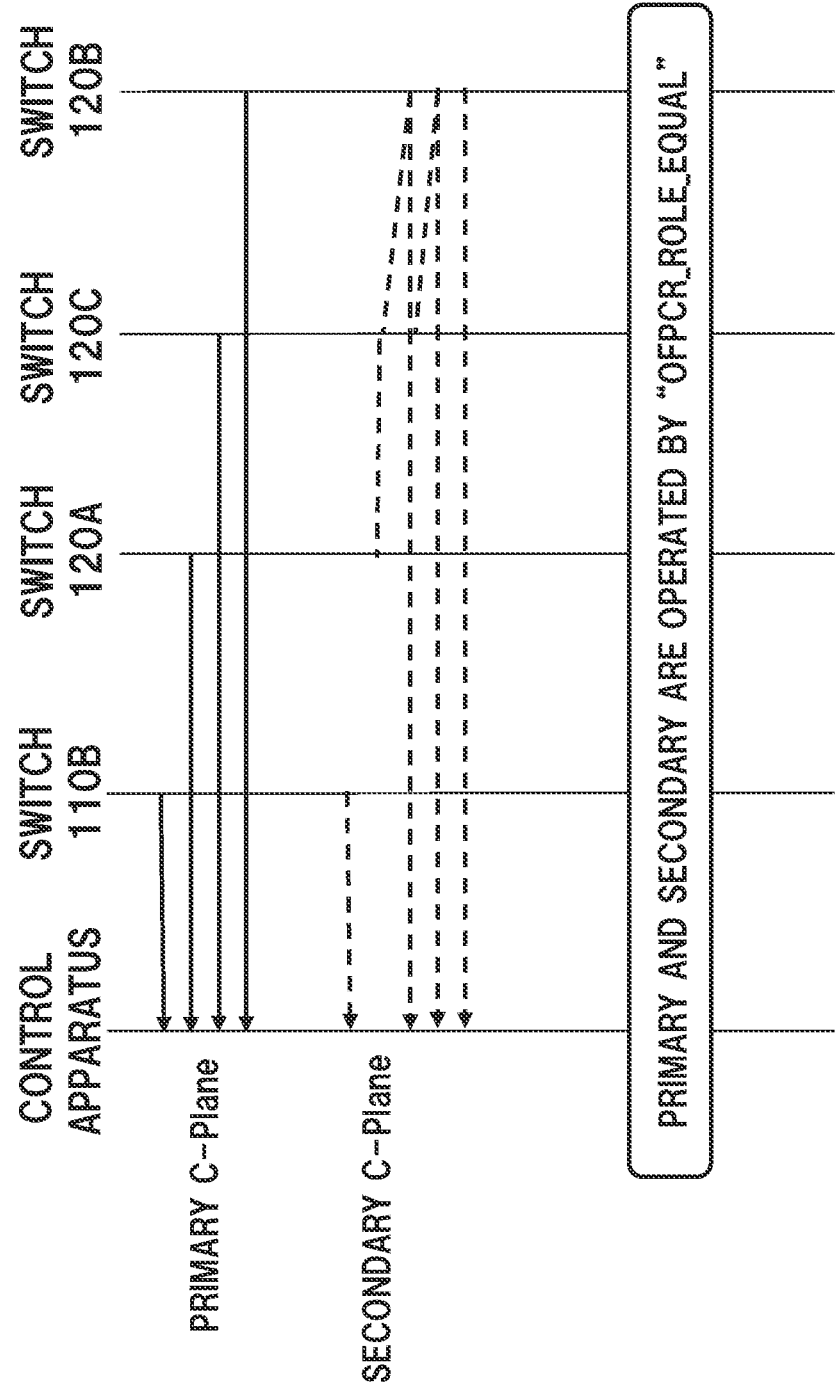
FIG. 16 is a sequence diagram showing flows of control information from the switch to the control apparatus in the third example embodiment of the present invention.

FIG. 16 is a sequence diagram showing packet transmission actions between the switches and the control apparatus using the clockwise (primary (Pri)) control channel and the counterclockwise (secondary (Sec)) control channel. Herein, such configuration may be realized by operating each of the switches as if two control apparatuses are present. Such redundant control apparatuses may be realized by operating the control apparatus with OFOPCR_ROLE_EQUAL described in NPL 1.

Figure 17:
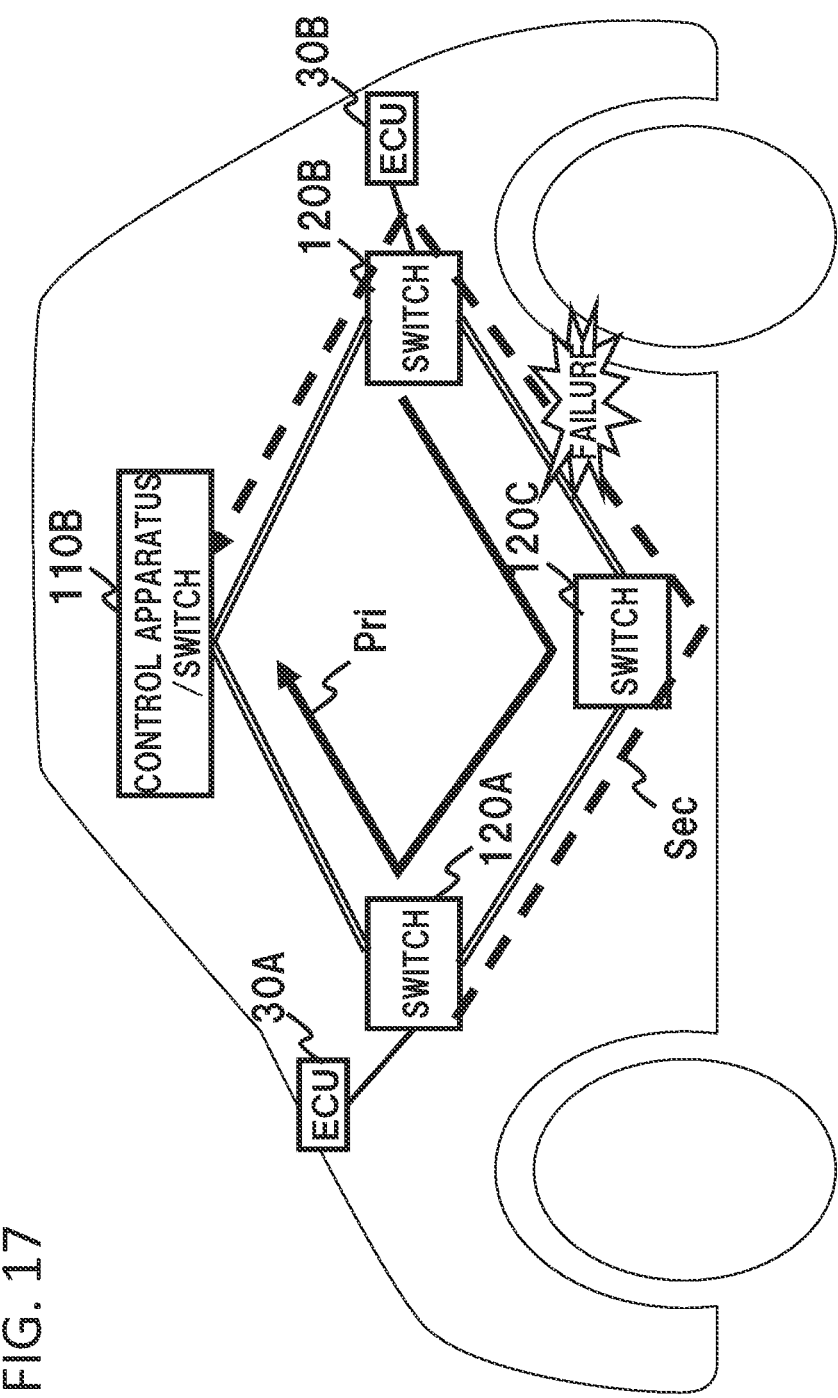
FIG. 17 is an explanatory view of actions by the communication system (on-board network system) of the third example embodiment of the present invention.
Figure 18:
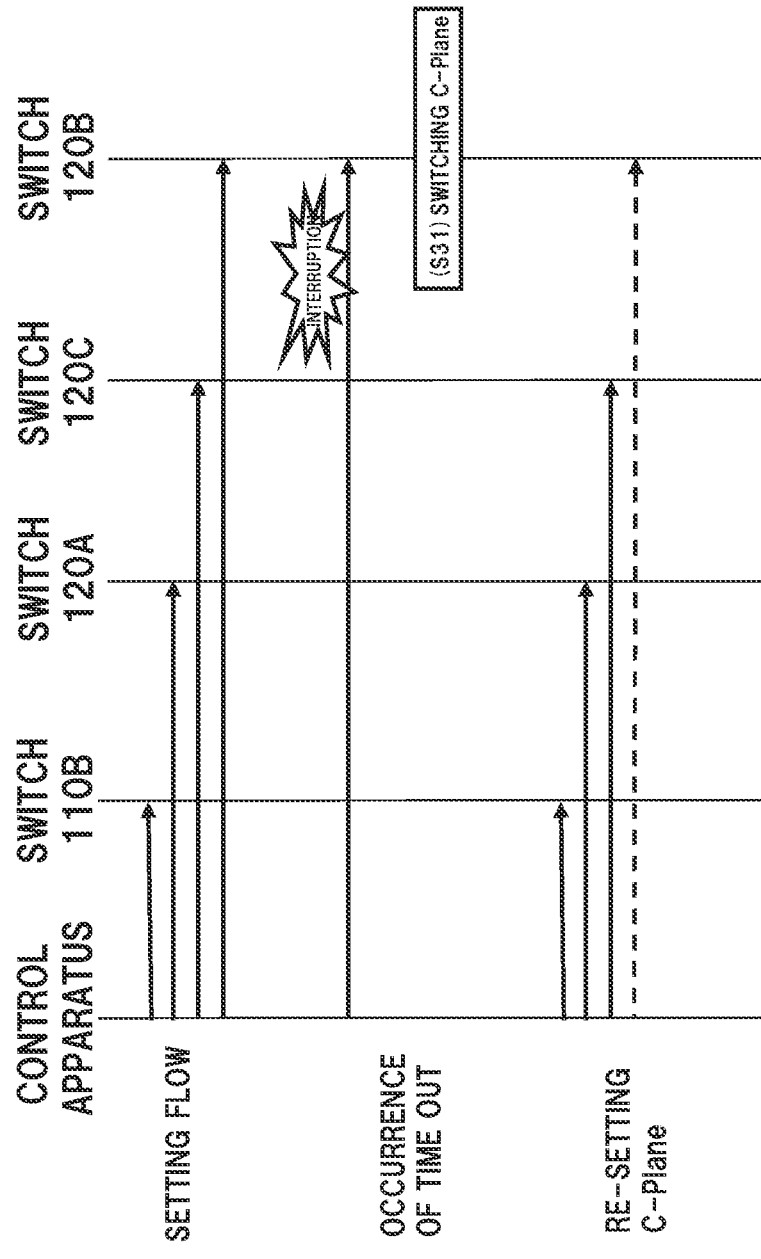
FIG. 18 is a sequence diagram showing actions of the third example embodiment of the present invention.

Herein, for example, as illustrated in FIG. 17, FIG. 18, after setting the control entries to the switches 110B, 120A to 120C, packets between ECUs are generated frequently (for example, communications in a millisecond order) in the communication system (on-board network). After that, it is assumed that a failure occurs in the primary control channel between the switches 120B, 120C due to certain causes. In such case, interruption of packets from the switch 120C occurs in the switch 120B as illustrated in FIG. 18. The switch 120B having detected such packet interruption performs a switching action for the control channel. For example, as illustrated in lower side in FIG. 18, the switch 120B arranged on downstream of the secondary control channel rather than the switch 120C may perform switching of the control channel from the primary control channel to the secondary control channel so as to maintain communication with the control apparatus 110B. The switching of the control channels in the switch 120B may utilize a configuration where transmission tables for primary, secondary are preliminary prepared as tables for jump destination tables for multi tables and the jump destination tables are switched as a response to the occurrence of the failure or the like.

Herein, presence or absence of the control channel failure may be determined by adopting a method where the control apparatus 110B transmits a predetermined message so as to receive an answerback, and the like. In addition, a method may be also adopted, in which the control apparatus 110B transmits a packet to a given switch from a port for the control channel and confirms whether or not the reception side may receive it normally. Alternatively, the control apparatus may cause the switch to reply the value on the register at a predetermined interval so as to confirm whether or not the change of the value is correct.

As explained above, according to the present example embodiment, in addition to the effects exerted by the first, second example embodiments, physical lines between the control apparatus and the switches may be shared so as to reduce the length of wire harness.

Although each of the example embodiments of the present invention are explained hereinabove, the present invention is not limited to the above example embodiments, and further variations, substitutions, adjustments may be added thereto within an ambit which does not depart from the basic technical concept of the present invention. For example, the network configuration, the configuration of each element, the expression of messages illustrated in each drawing are one example for facilitating understanding of the present invention, thus not limited to the configurations illustrated in these drawings.

In addition, although the switches are explained as comprising the registers 21, 21A in the first to third example embodiments, the registers are not limited to those in a limited sense. Alternatively, an apparatus capable of holding the vehicle state information and capable of storing information which may be used as the match conditions by the switches may be used as the register.

Figure 19:
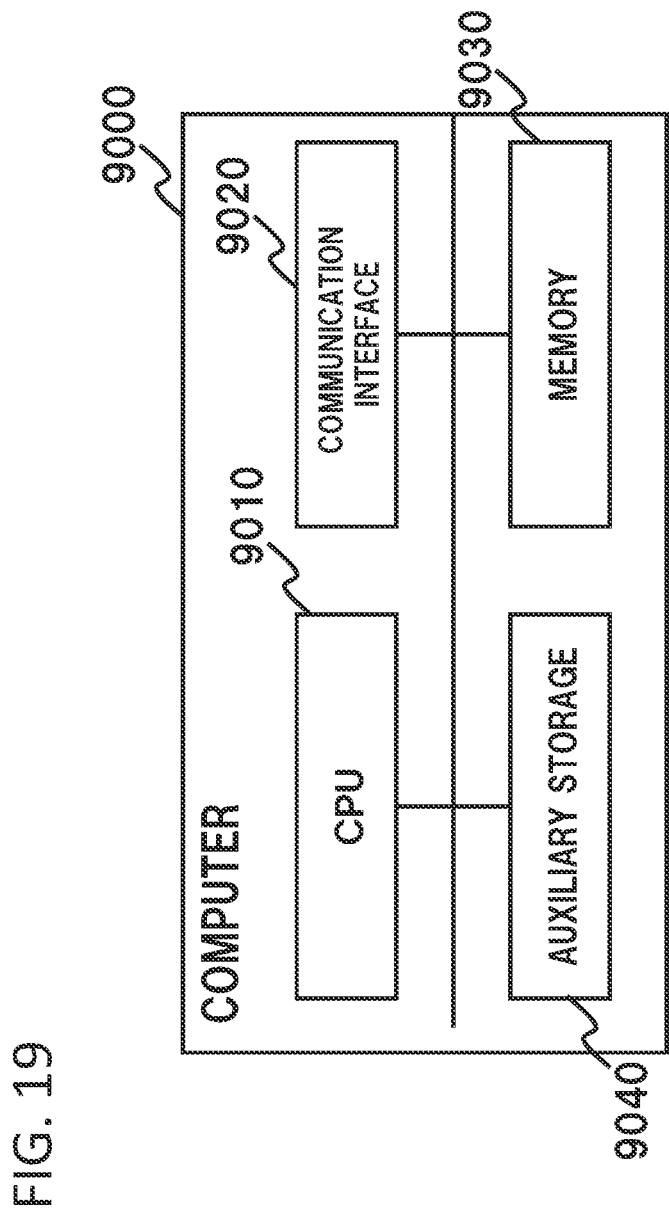
FIG. 19 is a diagram showing a configuration of a computer configuring the switch or the control apparatus of the present invention.

In addition, the schemes described in the first to third example embodiments may be realized (implemented) by a program which causes a computer functioning as the switches or the control apparatus (9000 in FIG. 19) to realize the functions as these apparatuses. Such computer is exemplified by a configuration comprising CPU (Central Processing Unit) 9010, a communication interface 9020, a memory 9030, and an auxiliary storage 9040 as illustrated in FIG. 19. That is, CPU 9010 in FIG. 19 may execute a packet program and a register update program so as to execute an update process for each calculation parameter held by the auxiliary storage 9040 and the like.

That is, each part (processing means, function) of the switches or the control apparatus described in the above first to third example embodiments may be realized by a computer program which causes a processor mounted on these apparatuses to execute each process above using their hardware(s).

Finally, preferable modes of the present invention are summarized.

First Mode (See the switch according to the first aspect above.)

Second Mode

It is preferable that the switch is arranged between ECUs mounted on a vehicle.

Third Mode

A configuration may be cited for the switch, where multiple registers are provided and values on the register respectively indicate vehicle states.

Fourth Mode

It is preferable that at least one of the vehicle states indicates a shift position.

Fifth Mode

It is preferable that at least one of the vehicle states indicates a key switch state.

Sixth Mode

A configuration may be cited for the switch, where the register change part notifies the predetermined control apparatus that the register value is changed in a case where the value on the register is changed.

Seventh Mode

The switch may be further configured to formulate a control channel having a ring shape topology together with other switches so as to connect to the predetermined control apparatus, and have a function that performs switching of the control channel when a failure occurs in the ring shape topology.

Eighth Mode (See the control apparatus according to the second aspect above.)

Ninth Mode (See the communication system according to the third aspect above.)

Tenth Mode (See the communication controlling method according to the fourth aspect above.)

Eleventh Mode (See the program according to the fifth aspect above.)

Herein, the eighth to eleventh modes may be developed to second to seventh modes like as the first mode.

Herein, each disclosure of the above PTLs and NPLs is incorporated herein by reference thereto. Variations and adjustments of the example embodiments and examples are possible within the ambit of the entire disclosure (including the claims) of the present invention and based on the basic technical concept of the present invention. Various combinations and selections (including non-selection) of various disclosed elements (including each element in each claim, each example embodiment, each example, each drawing, etc.) are possible within the ambit of the disclosure of the present invention. Namely, the present invention of course includes various variations and modifications that could be made by those skilled in the art according to the overall disclosure including the claims and the technical concept. Particularly, a numerical value range described in the present description should be interpreted as describing arbitrary numerical values or small ranges included in the ranges, even if they are not described explicitly.

REFERENCE SIGNS LIST 10, 10A, 110A: control apparatus (controller)
11: switch control part
20, 20A, 20B, 120A to 120C: switch
21: register
21A: register group
22, 22A: control entry holding part
23, 23A: packet processing part
24, 24A: register change part
30A, 30B, 30C: ECU
110B: control apparatus/switch
9000: computer
9010: CPU
9020: communication interface
9030: memory
9040: auxiliary storage

What is claimed is:

1. A switch, comprising:
a register indicating a vehicle state among a plurality of vehicle states;
a memory storing program instructions; and
at least one processor in circuit communication with the memory, the at least one processor configured to execute the program instructions to:
hold control entries, at least one of which including match conditions of the vehicle state and actions specifying a destination,
receive a packet,
select a control entry that matches the vehicle state indicated on the register, and
output the packet to the destination specified in the control entry,
wherein at least one of the plurality of vehicle states indicates a shift position, and the control entries comprise a first control entry, wherein the first control entry is associated with a reception of the packet from a front camera, and wherein a value of the register indicates that the shift position corresponds to an advance mode of a vehicle.

2. The switch according to claim 1, wherein
at least one of the plurality of vehicle states indicates a key switch state.

3. The switch according to claim 1, wherein
the at least one processor is further configured to notify a predetermined control apparatus that a register value is changed in a case where a value of the register is changed.

4. The switch according to claim 1, wherein the switch configures a control channel having a ring shape topology together with other switches so as to connect to a predetermined control apparatus, and
performs switching of the control channel when a failure occurs in the ring shape topology.

5. The switch according to claim 1, wherein the control entries comprise a second control entry, wherein the second control entry is associated with a rewrite of a value of the register to indicate the shift position is a back mode of a vehicle, wherein the second control entry is associated with a reception of the packet from a back camera.

6. A control apparatus, comprising:
a register indicating a vehicle state among a plurality of vehicle states;
at least a processor; and
a memory in circuit communication with the processor;
wherein the processor is configured to execute program instructions stored in the memory to implement:
a switch control part, implemented by the processor, configured to set a first control entry of a switch, wherein the first control entry is for setting change instructions for a value of a register held by the switch, and a second control entry which causes the switch to execute a predetermined process using the value of the register as a match condition,
wherein the switch is configured to:
hold control entries, at least one of which including match conditions of the vehicle state and actions specifying a destination, wherein the control entries comprise the first control entry and the second control entry,
receive a packet,
select a control entry that matches the vehicle state indicated on the register, and
output the packet to the destination specified in the control entry,
wherein at least one of the plurality of vehicle states indicates a shift position, and the control entries comprise a first control entry, wherein the first control entry is associated with a reception of the packet from a front camera, and wherein a value of the register indicates that the shift position corresponds to an advance mode of a vehicle.

7. The control apparatus according to claim 6, that, based on a notice of change of the value on the register from the switch, causes switch(es) other than the switch to change the value of the register.

8. A communication system, comprising:
a predetermined control apparatus;
a switch that comprises:
a register indicating a vehicle state among a plurality of vehicle states;
a memory storing program instructions; and
at least one processor in circuit communication with the memory, the at least one processor configured to execute the program instructions to:
hold control entries, at least one of which including match conditions of the vehicle state and actions specifying a destination,
receive a packet,
select a control entry that matches the vehicle state indicated on the register, and
output the packet to the destination specified in the control entry,
wherein at least one of the plurality of vehicle states indicates a shift position, and the control entries comprise a first control entry, wherein the first control entry is associated with a reception of the packet from a front camera, and wherein a value of the register indicates that the shift position corresponds to an advance mode of a vehicle.

9. The communication system according to claim 8, wherein
the switch is arranged between ECUs mounted on a vehicle.

10. The communication system according to claim 8, wherein
the switch comprises a plurality of the registers and values of the plurality of registers respectively indicate the plurality of vehicle states.

11. The communication system according to claim 10, wherein
at least one of the plurality of vehicle states indicates a key switch state.

12. The communication system according to claim 8, wherein
the at least one processor is further configured to notify the predetermined control apparatus that a register value is changed in a case where a value of the register is changed.

13. The communication system according to claim 8, wherein
the switch configures a control channel having a ring shape topology together with other switches so as to connect to the predetermined control apparatus, and performs switching of the control channel when a failure occurs in the ring shape topology.

* * * * *